US011086570B2

(12) United States Patent
Lee

(10) Patent No.: US 11,086,570 B2
(45) Date of Patent: Aug. 10, 2021

(54) STORAGE DEVICE, CONTROLLER AND METHOD FOR OPERATING CONTROLLER

(71) Applicant: SK hynix Inc., Gyeonggi-do (KR)

(72) Inventor: Ga-Young Lee, Gyeonggi-do (KR)

(73) Assignee: SK hynix Inc., Gyeonggi-do (KR)

(*) Notice: Subject to any disclaimer, the term of this patent is extended or adjusted under 35 U.S.C. 154(b) by 6 days.

(21) Appl. No.: 16/671,941

(22) Filed: Nov. 1, 2019

(65) Prior Publication Data
US 2020/0319824 A1 Oct. 8, 2020

(30) Foreign Application Priority Data
Apr. 3, 2019 (KR) .......................... 10-2019-0039241

(51) Int. Cl.
*G06F 3/06* (2006.01)
(52) U.S. Cl.
CPC .......... *G06F 3/0659* (2013.01); *G06F 3/0625* (2013.01); *G06F 3/0679* (2013.01)
(58) Field of Classification Search
CPC .............................. G06F 3/0659; G06F 3/0625
USPC ......................................................... 711/154
See application file for complete search history.

(56) References Cited

U.S. PATENT DOCUMENTS

2009/0019243 A1* 1/2009 Hur ....................... G06F 1/3275
711/158

FOREIGN PATENT DOCUMENTS

KR 10-2016-0059834 5/2016
KR 10-2018-0074138 7/2018

* cited by examiner

*Primary Examiner* — Jae U Yu
(74) *Attorney, Agent, or Firm* — IP & T Group LLP

(57) ABSTRACT

A storage device, a controller and a method for operating a controller are disclosed. The controller includes a descriptor storage circuit configured to store at least one descriptor corresponding to a command received from a host in one descriptor queue among N (N is a natural number) number of descriptor queues; a descriptor queue selection circuit configured to select one descriptor queue among the descriptor queues, as a target descriptor queue; and a descriptor execution control circuit configured to determine whether an operation indicated by a first descriptor stored in the target descriptor queue is executable, based on information on an available power budget and information on a power consumption amount for the first descriptor, and, when the operation indicated by the first descriptor is executable, control whether to execute an operation indicated by a second descriptor stored together with the first descriptor in the target descriptor queue.

17 Claims, 12 Drawing Sheets

*FIG.10*

| index | mode | | | | | Time | power value |
|---|---|---|---|---|---|---|---|
| | mode4 | mode3 | mode2 | mode1 | mode0 | | |
| 0 | 0 | 1 | 0 | 0 | 0 | 24 | 80 |
| 1 | 1 | 1 | 0 | 0 | 0 | 32 | X |
| 2 | 1 | 0 | 0 | 0 | 0 | X | 80 |

*FIG.11*

| index | mode | | | | | Time | value |
|---|---|---|---|---|---|---|---|
| | mode4 | mode3 | mode2 | mode1 | mode0 | | |
| 0 | 0 | 1 | 0 | 0 | 0 | 24 | 80 |
| 1 | 1 | 1 | 1 | 0 | 0 | 32 | 80 |
| 2 | 1 | 0 | 0 | 0 | 0 | X | 80 |

STORAGE DEVICE, CONTROLLER AND METHOD FOR OPERATING CONTROLLER

CROSS-REFERENCE TO RELATED APPLICATION

The present application claims priority to Korean Patent Application No. 10-2019-0039241 filed on Apr. 3, 2019, which is incorporated herein by reference in its entirety.

BACKGROUND

1. Technical Field

Various embodiments generally relate to a storage device, a controller and a method for operating a controller.

2. Related Art

A storage device is a device which stores data based on a request of a host such as a computer and a smartphone. The storage device includes not only a device which stores data in a magnetic disk, such as a hard disk drive (HDD), but also a device which stores data in a nonvolatile memory, such as a solid state drive (SDD), a universal flash storage (UFS) device and an embedded MMC (eMMC) device.

The nonvolatile memory includes a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), and a ferroelectric RAM (FRAM).

A storage device includes a controller therein. The controller may receive a command from a host, and may execute operations for reading/writing data from/in a volatile memory or a nonvolatile memory in the storage device, based on a received request.

SUMMARY

Various embodiments are directed to a storage device, a controller and a method for operating a controller, capable of effectively executing operations indicated by plural descriptors for a single command.

Also, various embodiments are directed to a storage device, a controller and a method for operating a controller, capable of consecutively executing operations indicated by plural descriptors for a single command thereby improving the performance.

Further, various embodiments are directed to a storage device, a controller and a method for operating a controller, capable of effectively processing one command corresponding to one or more descriptors.

In an embodiment, a controller suitable for controlling a semiconductor memory device may include: a descriptor storage circuit configured to queue at least one descriptor corresponding to a command received from a host in one descriptor queue among N number of descriptor queues where N is a natural number; a descriptor queue selection circuit configured to select one descriptor queue among the N number of descriptor queues, as a target descriptor queue; and a descriptor execution control circuit configured to determine whether an operation indicated by a first descriptor queued in the target descriptor queue is executable, based on information on an available power budget and information on a power consumption amount estimated for the first descriptor, and control, when it is determined that the operation indicated by the first descriptor is executable, whether to execute an operation indicated by a second descriptor queued together with the first descriptor in the target descriptor queue.

In an embodiment, a storage device may include: a semiconductor memory device; and a controller configured to control the semiconductor memory device, and execute an operation indicated by at least one descriptor, the controller including: a descriptor storage circuit configured to queue at least one descriptor corresponding to a command received from a host in one descriptor queue among N number of descriptor queues where N is a natural number; a descriptor queue selection circuit configured to select one descriptor queue among the N number of descriptor queues, as a target descriptor queue; and a descriptor execution control circuit configured to determine whether an operation indicated by a first descriptor queued in the target descriptor queue is executable, based on information on an available power budget and information on a power consumption amount estimated for the first descriptor, and control, when it is determined that the operation indicated by the first descriptor is executable, whether to execute an operation indicated by a second descriptor queued together with the first descriptor in the target descriptor queue.

In an embodiment, a method for operating a controller suitable for controlling a semiconductor memory device may include: queueing at least one descriptor corresponding to a command received from a host in one descriptor queue among N number of descriptor queues where N is a natural number; selecting one descriptor queue among the N number of descriptor queues, as a target descriptor queue; determining whether an operation indicated by a first descriptor queued in the target descriptor queue is executable based on information on an available power budget and information on a power consumption amount estimated for the first descriptor; and controlling, when it is determined that the operation indicated by the first descriptor is executable, whether to execute an operation indicated by a second descriptor queued together with the first descriptor in the target descriptor queue.

In an embodiment, an operating method of controller may include: queueing a group of plural descriptors for a single command; controlling a memory device to consecutively perform operations according to the group when first power requirement for an operation to be first performed according to a first descriptor within the group falls within an available power budget of the memory device, wherein subsequent power requirement for an operation to be subsequently performed according to a subsequent descriptor within the group is set as the first power requirement or less.

The embodiments of the disclosure may provide a storage device, a controller and a method for operating a controller, capable of effectively executing operations indicated by plural descriptors for a single command.

Also, the embodiments of the disclosure may provide a storage device, a controller and a method for operating a controller, capable of consecutively executing operations indicated by plural descriptors for a single command thereby improving the performance.

Further, the embodiments of the disclosure may provide a storage device, a controller and a method for operating a controller, capable of effectively processing one command corresponding to one or more descriptors.

BRIEF DESCRIPTION OF THE DRAWINGS

FIG. 10 is a power table for controlling the execution of an operation indicated by a descriptor in accordance with embodiments of the disclosure.

FIG. 11 is a power table for controlling the execution of an operation indicated by a descriptor in accordance with embodiments of the disclosure.

DETAILED DESCRIPTION

Figure 1:
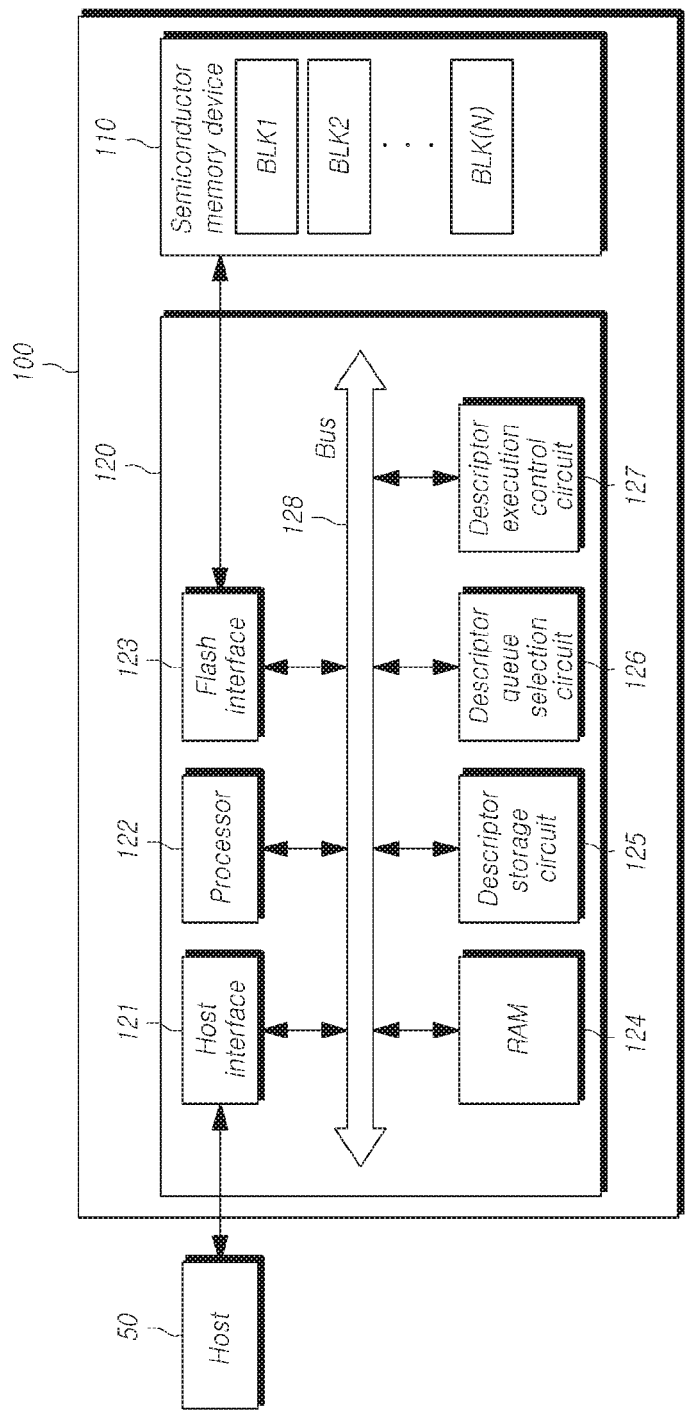
FIG. 1 is a configuration diagram of a storage device in accordance with embodiments of the disclosure.

In the disclosure, advantages, features and methods for achieving the advantages and features will become more apparent after a reading of the following embodiments taken in conjunction with the accompanying drawings. The disclosure may, however, be embodied in different forms and should not be construed as being limited to the embodiments set forth herein. Rather, these embodiments of the disclosure are provided to describe the present disclosure in detail to the extent that a person skilled in the art to which the disclosure pertains can easily carry out the technical ideas of the present disclosure.

It is noted that reference to "an embodiment," "another embodiment" or the like does not necessarily mean only one embodiment, and different references to any such phrase are not necessarily to the same embodiment(s).

It is to be understood herein that embodiments of the disclosure are not limited to the particulars shown in the drawings and that the drawings are not necessarily to scale and in some instances proportions may have been exaggerated in order to more clearly depict certain features of the disclosure. Like reference numerals denote like elements throughout the drawings and the description.

While particular terminology is used herein, it is to be appreciated that the terminology used herein is for the purpose of describing particular embodiments of the disclosure only and is not intended to limit the scope of the embodiments of the disclosure.

Specific structural or functional descriptions related to embodiments according to the disclosure and disclosed in the present specification or application are merely illustrated to describe embodiments of the disclosure. The embodiments of the disclosure may be implemented in various forms and should not be interpreted as being limited to the embodiments described in the present specification or application.

The embodiments according to the disclosure may be modified in various manners and may have various forms, so that specific embodiments are intended to be illustrated in the drawings and described in detail in the present specification or application. However, it should be understood that those embodiments are not intended to limit the embodiments based on the concept of the disclosure to specific disclosure forms and the embodiments include all changes, equivalents or modifications included in the spirit and scope of the disclosure.

As used herein, the term "and/or" includes any and all combinations of one or more of the associated listed items. The terms such as "first" and "second" may be used to describe various components, but those components should not be limited by the terms. The terms are merely used to distinguish one component from other components. For example, a first component may be designated as a second component and a second component may be designated as a first component in the similar manner, without departing from the scope based on the concept of the disclosure.

It will be understood that, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other representations describing relationships among components, that is, "between" and "directly between" or "adjacent to," and "directly adjacent to," should be interpreted in a similar manner.

A singular expression includes a plural expression unless a description to the contrary is specifically pointed out in context. The articles 'a' and 'an' as used in this application and the appended claims should generally be construed to mean 'one or more' unless specified otherwise or clear from context to be directed to a singular form. In the present specification, it should be understood that the terms such as "include" or "have" are merely intended to indicate that features, numbers, steps, operations, components, parts, or combinations thereof are present, and are not intended to exclude a possibility that one or more other features, numbers, steps, operations, components, parts, or combinations thereof will be present or added.

Unless differently defined, all terms used herein, including technical or scientific terms, have the same meanings as the terms generally understood by those skilled in the art to which the disclosure pertains. The terms identical to those defined in generally used dictionaries should be interpreted as having meanings identical to contextual meanings of the related art, and are not interpreted as being ideal or excessively formal meanings unless the terms are defined in the present specification.

Detailed description of well-known functions and structures incorporated herein may be omitted to avoid obscuring the subject matter of the disclosure. This aims to omit unnecessary description so as to make the subject matter of the disclosure clearer.

Also, in describing the components of the embodiments of the disclosure, there may be terms used like first, second, A, B, (a), and (b). These are solely for the purpose of differentiating one component from the other but do not imply or suggest the substances, order or sequence of the components. If a component is described as "connected,"

"coupled", or "linked" to another component, it may mean that the component is not only directly "connected," "coupled", or "linked" but also is indirectly "connected," "coupled", or "linked" via a third component.

Various embodiments will be described below with reference to the accompanying drawings, to describe embodiments of the disclosure in detail to the extent that a person skilled in the art can easily carry out the technical idea of the embodiments of the disclosure.

FIG. 1 is a configuration diagram of a storage device 100 in accordance with embodiments of the disclosure.

Referring to FIG. 1, the storage device 100 may include a semiconductor memory device 110 and a controller 120.

The semiconductor memory device 110 may store data. The semiconductor memory device 110 operates in response to the control of the controller 120. The semiconductor memory device 110 may include a memory cell array including a plurality of memory cells which store data.

In the embodiments of the disclosure, the semiconductor memory device 110 may be, for example, a double data rate synchronous dynamic random access memory (DDR SDRAM), a low power double data rate 4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM) or a spin transfer torque random access memory (STT-RAM).

In the embodiments of the disclosure, the semiconductor memory device 110 may be realized as a three-dimensional array structure. The embodiments of the disclosure may be applied to not only a flash memory device in which a charge storage layer is configured by a conductive floating gate (FG) but also a charge trap flash (CTF) in which a charge storage layer is configured by a dielectric layer.

The semiconductor memory device 110 is configured to receive a command and an address from the controller 120 and access a region selected by the address in the memory cell array. In other words, the semiconductor memory device 110 may perform an operation corresponding to the command, for a region selected by the address.

For example, the semiconductor memory device 110 may perform a program operation, a read operation, and an erase operation. In the program operation, the semiconductor memory device 110 may program data to a region selected by the address. In the read operation, the semiconductor memory device 110 may read data from a region selected by the address. In the erase operation, the semiconductor memory device 110 may erase data stored in a region selected by the address.

The semiconductor memory device 110 may include therein a plurality of memory blocks. N (where N is a natural number) number of memory blocks included in the semiconductor memory device 110 may be designated by the reference symbols BLK1, BLK2, . . . , BLK(N), respectively.

The controller 120 may control the operation of the semiconductor memory device 110 according to a request of a host 50 or regardless of a request of the host 50. For example, the controller 120 may control write, read, erase, and background operations for the semiconductor memory device 110. For example, the background operation may be a garbage collection (GC) operation, a wear leveling (WL) operation, a bad block management (BBM) operation, or the like.

The controller 120 may include a host interface 121, a processor 122, a flash interface 123, a RAM 124, a descriptor storage circuit 125, a descriptor queue selection circuit 126, and a descriptor execution control circuit 127.

The host interface 121 provides an interface for communication with the host 50. When receiving a command from the host 50, the controller 120 may receive the command through the host interface 121, and then, may perform an operation of processing the received command.

The processor 122 may control general operations of the controller 120, and may perform a logic calculation. The processor 122 may communicate with the host 50 through the host interface 121, and may communicate with the semiconductor memory device 110 through the flash interface 123.

The processor 122 may perform the function of a flash translation layer (FTL). The processor 122 may translate a logical block address (LBA) provided by the host 50, into a physical block address (PBA), through the flash translation layer (FTL). The flash translation layer (FTL) may receive the logical block address (LBA) and translate it into the physical block address (PBA), by using a mapping table. There are various address mapping methods of the flash translation layer, depending on a mapping unit. Representative address mapping methods include a page mapping method, a block mapping method and a hybrid mapping method.

The processor 122 is configured to randomize data received from the host 50. For example, the processor 122 may randomize data received from the host 50, by using a randomizing seed. Randomized data as data to be stored is provided to the semiconductor memory device 110 and is programmed to the memory cell array.

In a read operation, the processor 122 is configured to derandomize data received from the semiconductor memory device 110. For example, the processor 122 may derandomize data received from the semiconductor memory device 110, by using a derandomizing seed. Derandomized data may be outputted to the host 50.

The processor 122 may drive a firmware loaded in the RAM 124 upon booting to control general operations of the controller 120 and perform a logic calculation. Operations of the descriptor storage circuit 125, the descriptor queue selection circuit 126, and the descriptor execution control circuit 127 to be described below may be implemented by corresponding firmware.

The flash interface 123 provides an interface for communication with the semiconductor memory device 110.

The RAM 124 may store a firmware, a program code, a command, or data necessary to drive the controller 120, and may be an SRAM or a DRAM.

The descriptor storage circuit 125 performs an operation of queueing at least one descriptor corresponding to a command received from the host 50, in one among N (N is a natural number) number of descriptor queues.

As used in the disclosure, the term 'circuit' may refer to hardware only circuit implementations and combinations of circuits and software (and/or firmware), as applicable and depending on design, and would also cover an implementation of merely a processor(s) or portion of a processor and its (or their) accompanying software and/or firmware.

A descriptor queue queues a descriptor as a unit.

A descriptor may instruct the semiconductor memory device 110 to perform a sub-operation for a single command (e.g., a read, program or erase command) provided from the host 50. One or more descriptors may configure a single command and one or more sub-operations, which respectively correspond to the descriptors, may configure an operation (e.g., a read, program or erase operation) to be performed in response to the single command.

In this regard, only one descriptor may correspond to one command, but a plurality of descriptors may also correspond to one command. In particular, when a command received from the host 50 includes detailed and combined operations, descriptors for the respective sub-operations may correspond to the command received from the host 50.

For instance, a read command as a single command may correspond to two descriptors: one for a read sensing operation of sensing data stored in the semiconductor memory device 110 and the other one for a data output operation of outputting sensed data.

For another instance, a cache read command as a single command for reading data stored in a cache may correspond to two descriptors: one for a cache read sensing operation of sensing data stored in the cache and the other one for a data output operation of outputting read data.

An operation in which at least one descriptor corresponding to a command received from the host 50 is queued in one among N (N is a natural number) number of descriptor queues will be described later in detail with reference to FIG. 4.

The descriptor queue selection circuit 126 performs an operation of selecting a target descriptor queue among the above-described N number of descriptor queues.

A target descriptor queue may be reselected according to a preset time interval or may be reselected when a predetermined event occurs. As an example of a scheme in which a target descriptor queue is selected, a target descriptor queue may be randomly selected among the N number of descriptor queues, may be selected in a round-robin manner, or may be selected depending on a priority determined depending on status information of each descriptor queue.

An example of a concrete operation for the descriptor queue selection circuit 126 to select one among the N number of descriptor queues as a target descriptor queue will be described later in detail with reference to FIG. 5.

The descriptor execution control circuit 127 may first perform an operation of determining whether to execute an operation indicated by a first descriptor queued in the target descriptor queue. In this regard, since a queue generally has a FIFO (first-in first-out) structure, the first descriptor may be a descriptor which is queued first among descriptors queued in the target descriptor queue.

The descriptor execution control circuit 127 may determine whether the operation indicated by the first descriptor queued in the target descriptor queue is executable based on information on an available power budget of the semiconductor memory device 110 and information on a power consumption amount estimated for the first descriptor. The power consumption amount estimated for a descriptor in the disclosure means a power consumption amount estimated as required for an operation to be performed in response to that descriptor.

The reason why the descriptor execution control circuit 127 determines whether the operation indicated by the first descriptor queued in the target descriptor queue is executable based on information on an available power budget and information on a power consumption amount estimated for the first descriptor, is as follows.

Power estimated as consumed by the storage device 100 to process an operation indicated by a command received from the host 50 differs for each type of command, and power estimated as consumed for each sub-operation differs even in one command.

If an operation that consumes a great amount of power is frequently performed for a short period of time, peak power increases such that the power consumption of the storage device 100 surges, which may cause a problem such as a current overflow in the storage device 100.

Thus, the controller 120 in the storage device 100 manages power consumption of the storage device 100 to prevent a phenomenon in which power consumption sharply increases. To this end, the controller 120 controls the execution of a sub-operation for a command received from the host 50 so that the command may be processed within a currently available power budget.

To this end, the controller 120 may determine a power consumption amount estimated for a sub-operation indicated by a descriptor, and may determine whether the operation indicated by the descriptor is executable by comparing the power consumption amount estimated for the descriptor with a currently available power budget.

For example, a power of y may be consumed when performing a read sensing operation and a power of y' may be consumed when performing a separate status checking operation. If the value of a currently available power budget z is $y>z>y'$, a descriptor is assigned which indicates the status checking operation is determined as executable, and a descriptor is assigned which indicates the read sensing operation is determined as not executable.

However, if all descriptors corresponding to different commands are queued in one descriptor queue, due to the FIFO structure of the queue, a subsequently queued descriptor cannot be executed until execution of a previously queued descriptor is completed. When descriptors are distributed and queued in plural descriptor queues, a subsequent descriptor queued in one queue among the descriptor queues may be executed even when a previous descriptor queued in another queue among the descriptor queues is determined as not executable. (For example, the previous descriptor queued in another queue among the descriptor queues may not executable due to the limited power budget).

Thus, the descriptor execution control circuit 127 may perform control so that, if an operation indicated by a first descriptor queued in a target descriptor queue is executable, the operation indicated by the first descriptor is executed, and if an operation indicated by a first descriptor queued in a target descriptor queue is not executable, an operation indicated by a descriptor queued in another descriptor queue is first executed and the operation indicated by the first descriptor may be executed after a power budget is secured.

Further, when it is determined that an operation indicated by a first descriptor is executable, the descriptor execution control circuit 127 may control whether to execute an operation indicated by a second descriptor queued together with the first descriptor in the target descriptor queue.

The second descriptor may be a descriptor which is queued subsequently to the first descriptor in the target descriptor queue. The second descriptor may or may not correspond to the same command as the first descriptor.

Hereinbelow, an example in which the descriptor execution control circuit 127 controls whether to execute the operation indicated by the second descriptor queued together with the first descriptor in the target descriptor queue will be described.

For instance, when an operation mode of the controller 120 is a first operation mode, the descriptor execution control circuit 127 may perform control so that, after an operation indicated by a first descriptor queued in a first descriptor queue selected as a target descriptor queue is executed, an operation indicated by a second descriptor queued in the first descriptor queue is consecutively executed when the second descriptor may correspond to the same command as the first descriptor. That is, the descriptor execution control circuit 127 may perform control so that, in the first operation mode, the first descriptor and the second descriptor queued in the target descriptor queue and corresponding to a single command are consecutively executed.

Where an operation mode of the controller 120 is a second operation mode different from the first operation mode, the descriptor execution control circuit 127 may perform control so that, after an operation indicated by the first descriptor queued in the first descriptor queue selected as a target descriptor queue is executed, an operation indicated by another descriptor queued in a second descriptor queue which is selected as a target descriptor queue subsequent to the first descriptor queue is executed. In other words, the descriptor execution control circuit 127 may perform control so that, in the second operation mode, the first descriptor and the second descriptor queued in the target descriptor queue are not consecutively executed.

An example in which the descriptor execution control circuit 127 controls an operation indicated by a descriptor queued in a target descriptor queue will be described later in detail through FIGS. 6 to 9.

In order to allow a command received from the host 50 to be processed within an available power budget, the descriptor execution control circuit 127 may determine whether an operation indicated by a descriptor is executable based on a power consumption amount estimated for each descriptor and an available power budget.

Power tables used to control execution of an operation indicated by a descriptor will be described later with reference to FIGS. 10 and 11.

The bus 128 may be configured to provide channels among the components of the controller 120.

Figure 2:
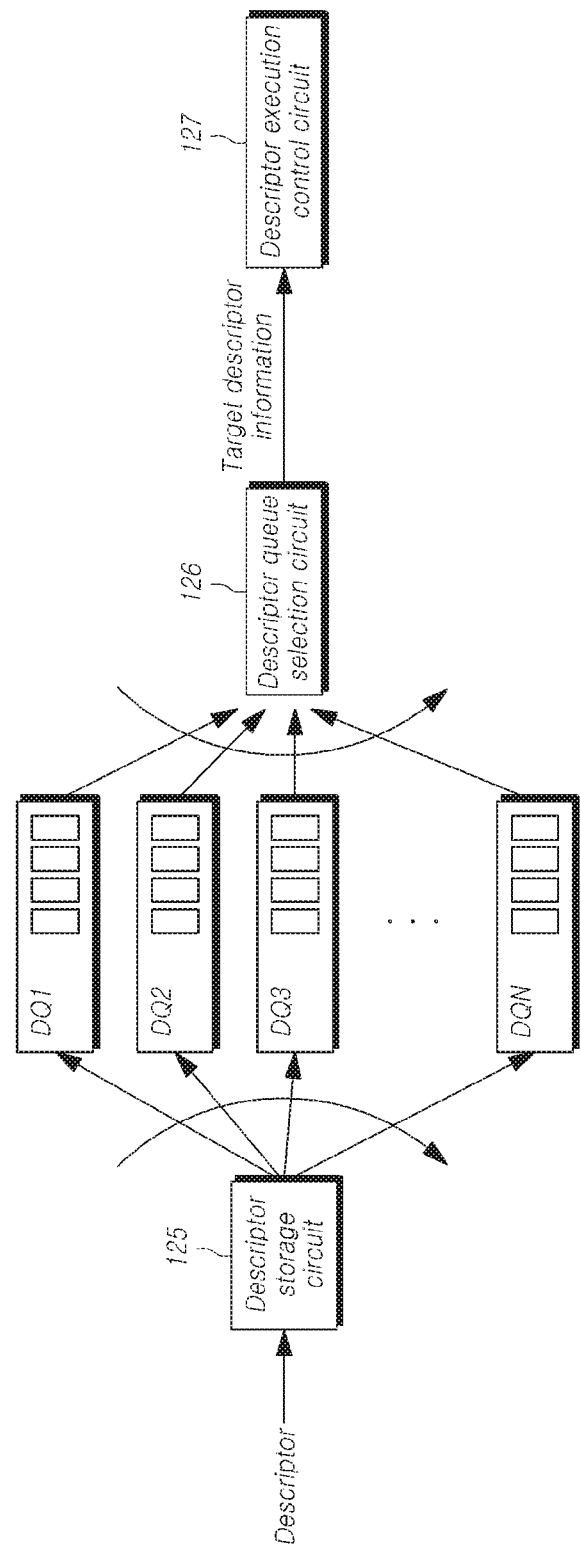
FIG. 2 is a diagram of the flow of an operation of storing and executing a descriptor in a controller of FIG. 1.

FIG. 2 is a diagram of an operation flow for the controller 120 in the storage device 100 of FIG. 1 to queue and execute a descriptor.

Referring to FIG. 2, the descriptor storage circuit 125 queues at least one descriptor corresponding to a command received from the host 50, in one queue among N number of descriptor queues DQ1 to DQN.

The descriptor queue selection circuit 126 may select one queue among the N number of descriptor queues DQ1 to DQN, as a target descriptor queue.

The operation in which the descriptor storage circuit 125 queues a descriptor in one descriptor queue among the N number of descriptor queues DQ1 to DQN, and the operation in which the descriptor queue selection circuit 126 selects one descriptor queue among the N number of descriptor queues DQ1 to DQN, as a target descriptor queue, are performed independently.

With respect to the target descriptor queue selected in the descriptor queue selection circuit 126, the descriptor execution control circuit 127 may determine whether an operation indicated by a first descriptor queued in the target descriptor queue is executable based on information on an available power budget and information on a power consumption amount estimated for the first descriptor.

When it is determined that the operation indicated by the first descriptor is executable, the descriptor execution control circuit 127 may control the execution of an operation indicated by a second descriptor queued together with the first descriptor in the target descriptor queue.

Figure 3:
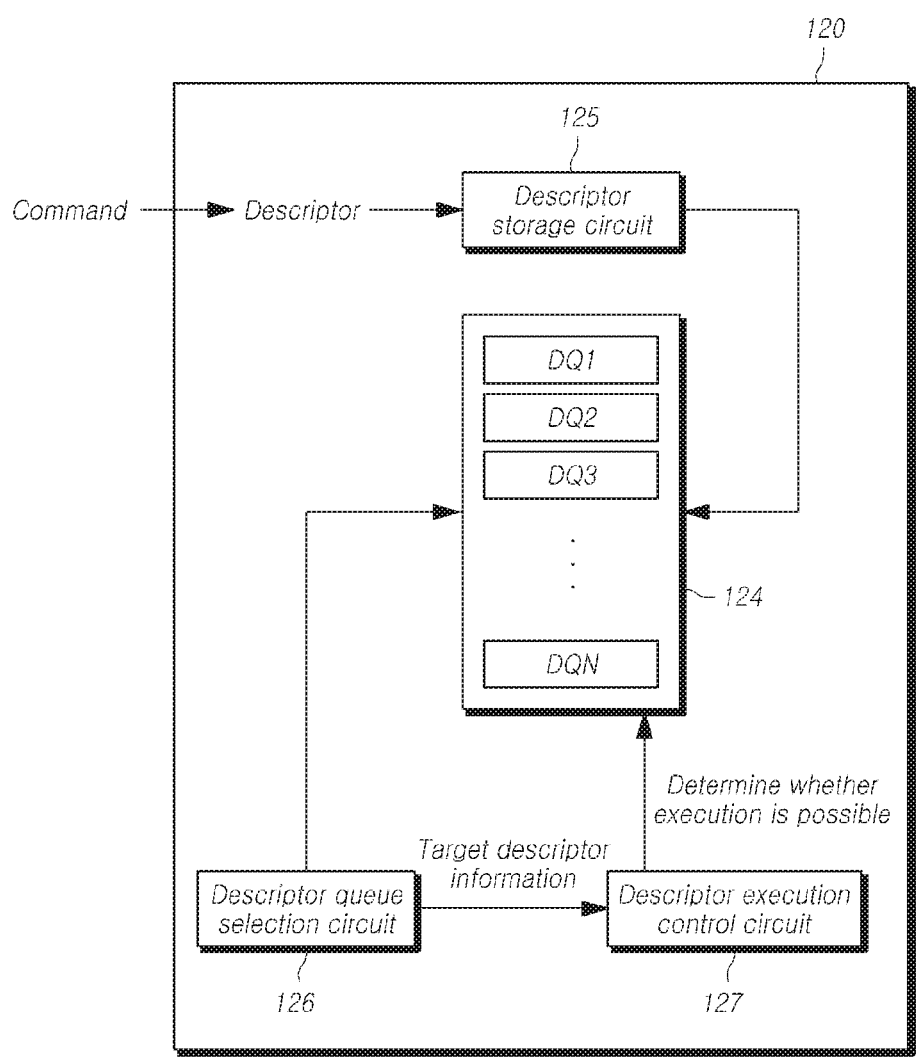
FIG. 3 is a diagram of an operation of storing and executing a descriptor in the controller of FIG. 1.

FIG. 3 is a diagram of an operation of storing and executing a descriptor in the controller 120 of FIG. 1.

Referring to FIG. 3, at least one descriptor corresponding to a command received from the host 50 may be queued in one descriptor queue among the N number of descriptor queues DQ1 to DQN by the descriptor storage circuit 125. The N number of descriptor queues DQ1 to DQN may be positioned in the RAM 124 in the controller 120.

The descriptor queue selection circuit 126 may select one descriptor queue among the N number of descriptor queues DQ1 to DQN positioned in the RAM 124, as a target descriptor queue.

With respect to the target descriptor queue selected in the descriptor queue selection circuit 126, the descriptor execution control circuit 127 may determine whether an operation indicated by a first descriptor queued in the target descriptor queue is executable based on information on an available power budget and information on a power consumption amount estimated for the first descriptor.

When it is determined that the operation indicated by the first descriptor is executable, the descriptor execution control circuit 127 may control the execution of an operation indicated by a second descriptor queued together with the first descriptor in the target descriptor queue.

Figure 4:
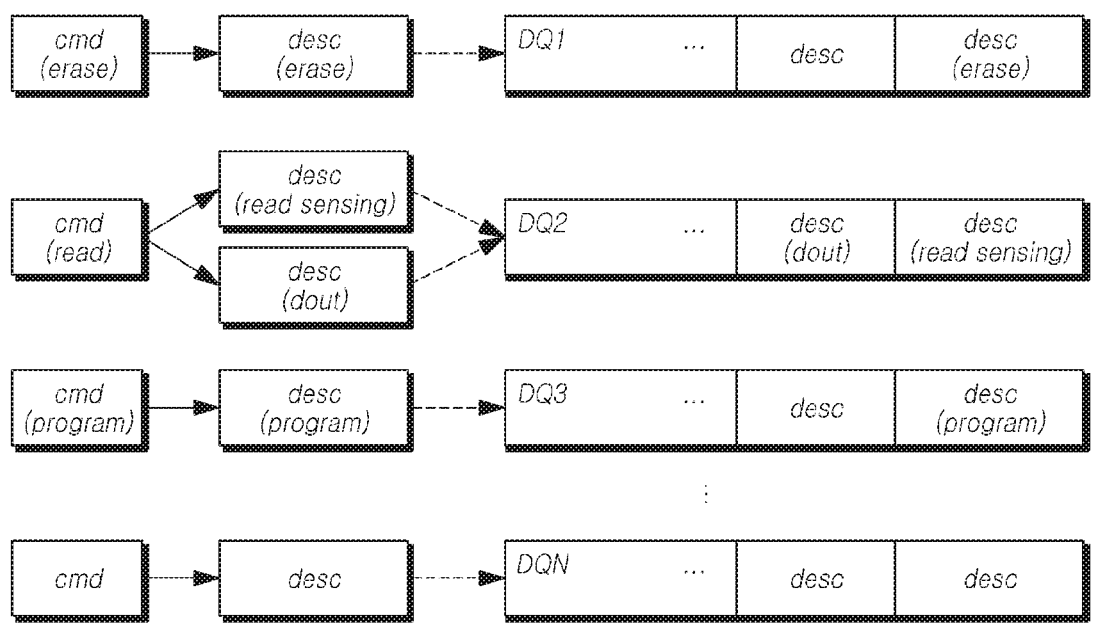
FIG. 4 is a diagram in which a descriptor corresponding to a command is queued in one of a plurality of descriptor queues in accordance with embodiments of the disclosure.

FIG. 4 is a diagram of an operation in which a descriptor corresponding to a command is queued in one descriptor queue in accordance with embodiments of the disclosure.

Referring to FIG. 4, a descriptor corresponding to a command received from the host 50 is queued in one descriptor queue among the N number of descriptor queues DQ1 to DQN.

When observing a relationship between a command and a descriptor, one descriptor desc(erase) or desc(program) may correspond to one command such as an erase command cmd(erase) and a program command cmd(program), and a plurality of descriptors desc(read sensing) and desc(dout) may correspond to one command such as a read command cmd(read). At this time, descriptors corresponding to a single command may be queued in a same descriptor queue among the descriptor queues DQ1 to DQN.

For instance, the descriptor desc(erase) corresponding to the erase command cmd(erase) is queued in the descriptor queue DQ1, and the descriptors desc(read sensing) and desc(dout) corresponding to the read command cmd(read) are queued in the descriptor queue DQ2, and the descriptor desc(program) corresponding to the program command cmd (program) is queued in the descriptor queue DQ3.

If queued descriptors are distributed in the N number of descriptor queues DQ1 to DQN in this way, the descriptor queue selection circuit 126 performs an operation of selecting one target descriptor queue among the N number of descriptor queues DQ1 to DQN.

Figure 5:
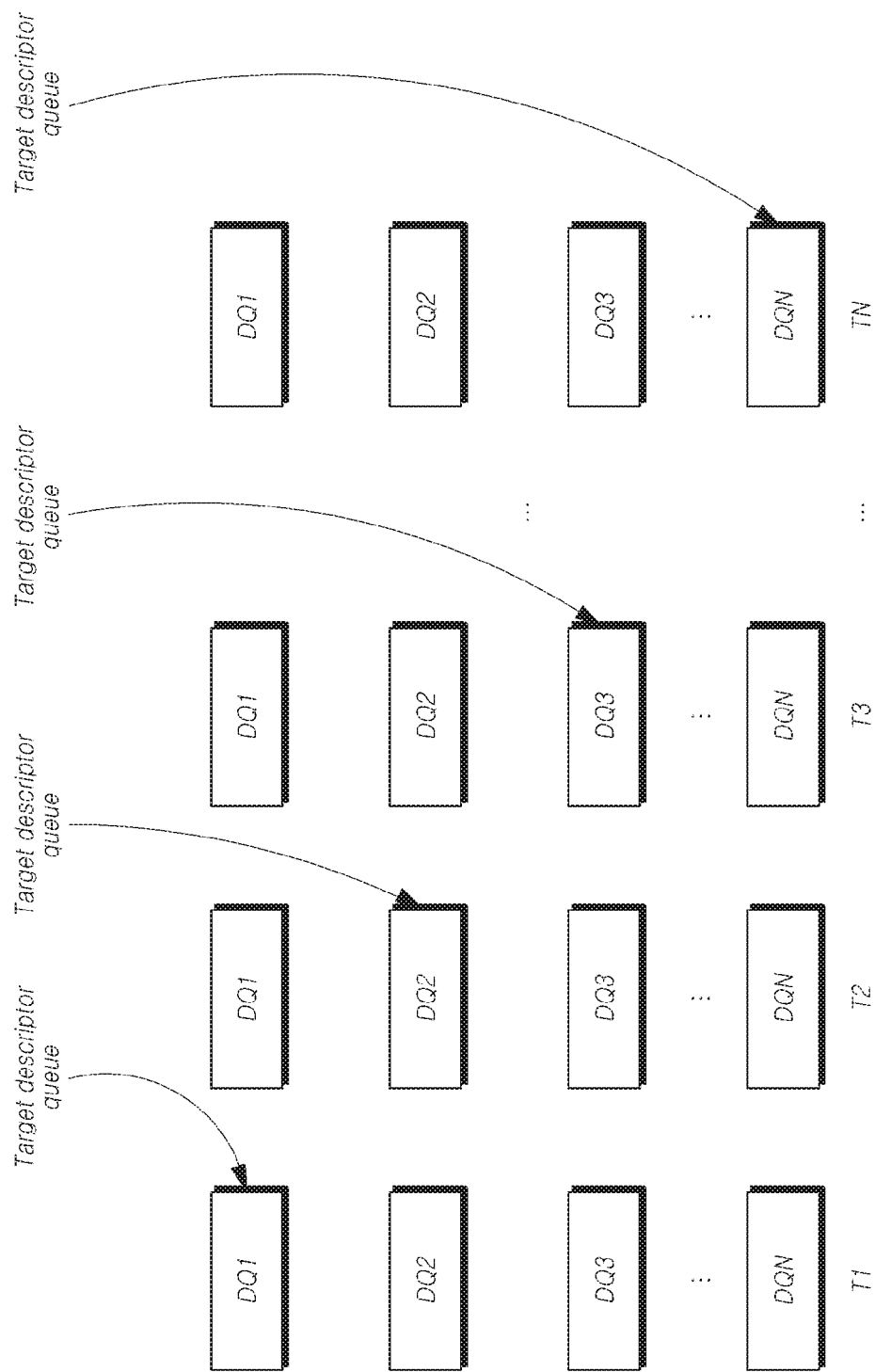
FIG. 5 is a diagram of an operation of selecting one of the descriptor queues as a target descriptor queue in accordance with embodiments of the disclosure.

FIG. 5 is a diagram of an operation of selecting one of the descriptor queues as a target descriptor queue in accordance with embodiments of the disclosure.

Referring to FIG. 5, the descriptor queue selection circuit 126 may select a target descriptor queue in a round-robin manner.

First, at a time T1, the descriptor queue selection circuit 126 selects the descriptor queue DQ1 among the N number of descriptor queues DQ1 to DQN, as a target descriptor queue.

Thereafter, the descriptor queue selection circuit 126 may select the descriptor queue DQ2 as a target descriptor queue at a time T2, may select the descriptor queue DQ3 as a target descriptor queue at a time T3, and, by repeating the same process, may select the descriptor queue DQN as a target descriptor queue at a time TN.

Namely, a target descriptor queue may be selected in a circulated manner one by one among the N number of descriptor queues DQ1 to DQN, for example, DQ1→DQ2→DQ3→ . . . →DQN→DQ1→DQ2→ . . . .

While it was described as an example in FIG. 5 that a target descriptor queue is selected in a circulated manner depending on a time, the disclosure is not limited thereto. For example, a target descriptor queue may be selected in a circulated manner when a preset event occurrence condition is satisfied instead of a time.

Figure 6:
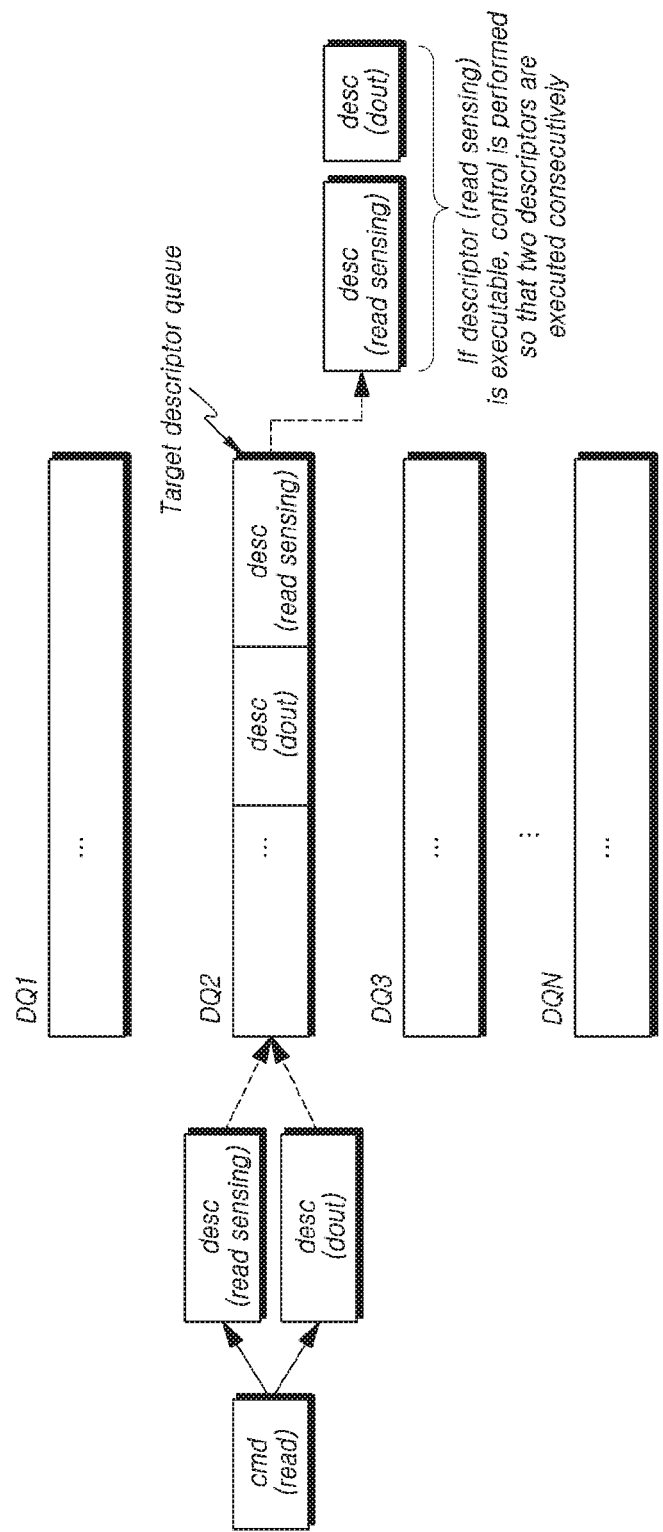
FIG. 6 is a diagram of controlling an operation indicated by a descriptor queued in a selected target descriptor queue in accordance with embodiments of the disclosure.

FIG. 6 is a diagram of controlling an operation indicated by a descriptor queued in a selected target descriptor queue in accordance with embodiments of the disclosure.

In the example of FIG. 6, the descriptor queue DQ2 is selected as a target descriptor queue by the descriptor queue selection circuit 126. Also, it is assumed that two descriptors desc(read sensing) and desc(dout) corresponding to one read command cmd(read) are queued in the descriptor queue DQ2. In the two descriptors desc(read sensing) and desc(dout), the descriptor desc(read sensing) is a descriptor which indicates a read sensing operation, and the descriptor desc(dout) is a descriptor which indicates a data output operation.

The descriptor execution control circuit 127 may determine whether an operation, that is, the read sensing operation indicated by the descriptor desc(read sensing) queued first among the descriptors queued in the descriptor queue DQ2 being the target descriptor queue is executable based on information on an available power budget and information on a power consumption amount estimated for the descriptor desc(read sensing).

When the descriptor desc(read sensing) is executable, the descriptor desc(dout) queued after the descriptor desc(read sensing) in the descriptor queue DQ2 may be executed consecutively. This is because the operation of the read command cmd(read) is completed only when the operation indicated by the descriptor desc(read sensing) and the operation indicated by the descriptor desc(dout) are executed.

If the operation indicated by the descriptor desc(read sensing) is executed but the operation indicated by the descriptor desc(dout) is not executed consecutively, another descriptor queue may be selected as a target descriptor queue, and thereafter, when the descriptor queue DQ2 is reselected as a target descriptor queue, the operation indicated by the descriptor desc(dout) may be executed. In this case, a problem may be caused in that a time at which the operation of the read command cmd(read) is completed, is delayed.

Thus, when the descriptor desc(read sensing) queued in the descriptor queue DQ2 is executable, the descriptor execution control circuit 127 may perform control so that, after the operation indicated by the descriptor desc(read sensing) is performed, the operation indicated by the descriptor desc(dout) may be executed consecutively.

When an operation indicated by a descriptor is completely executed, the descriptor is dequeued from a target descriptor queue.

On the other hand, when the descriptor desc(read sensing) is not executable, a separate descriptor queue different from a descriptor queue currently selected as a target descriptor queue may be reselected as the target descriptor queue. At this time, both the descriptors desc(read sensing) and desc(dout) are not dequeued from the target descriptor queue since the operations indicated thereby are not executed.

In this case, when the descriptor queue DQ2 is selected again as a target descriptor queue by the descriptor queue selection circuit 126, the descriptor execution control circuit 127 determines again whether the operation indicated by the descriptor desc(read sensing) is executable.

Figure 7:
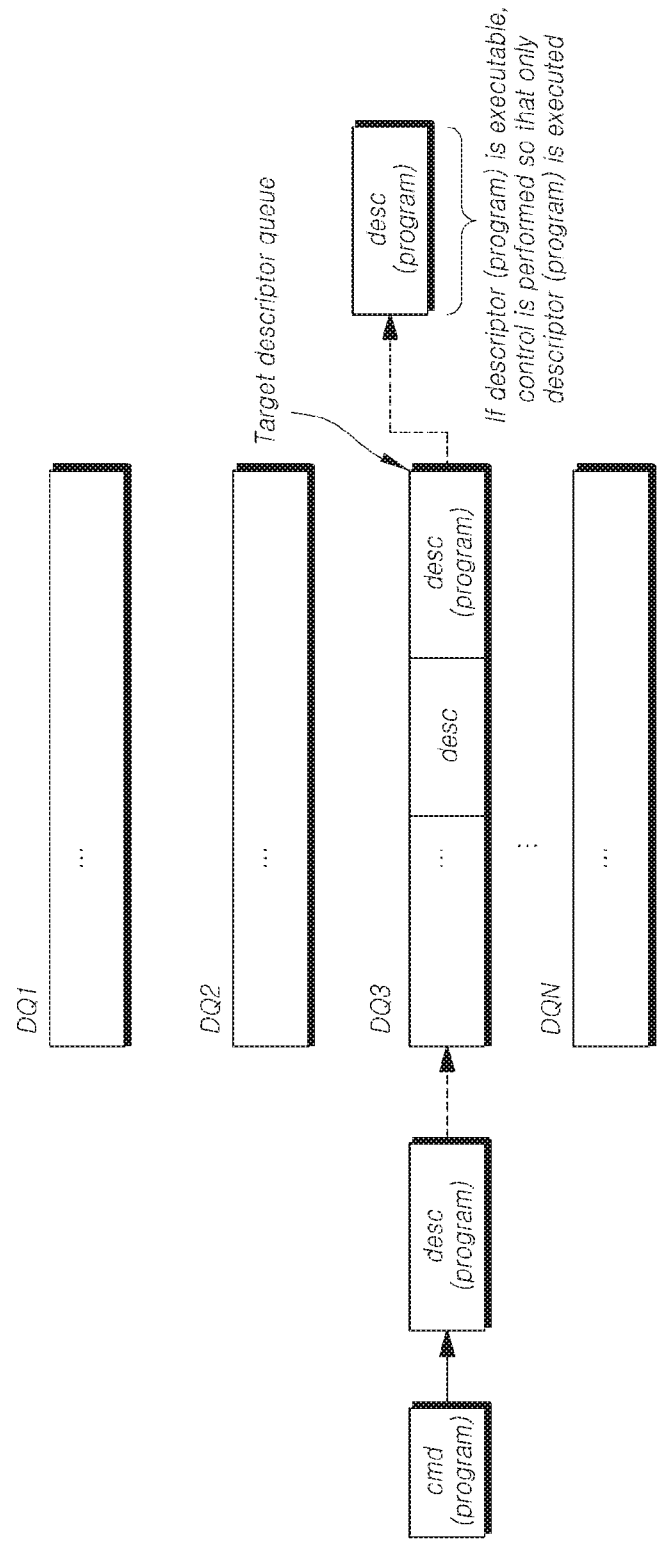
FIG. 7 is a diagram of controlling an operation indicated by a descriptor queued in a selected target descriptor queue in accordance with embodiments of the disclosure.

FIG. 7 is a diagram of controlling an operation indicated by a descriptor queued in a selected target descriptor queue in accordance with embodiments of the disclosure.

In FIG. 7, the descriptor queue DQ3 is selected as a target descriptor queue by the descriptor queue selection circuit 126. Also, one descriptor desc(program) corresponding to one program command cmd(program) is queued in the descriptor queue DQ3.

The descriptor execution control circuit 127 may determine whether an operation indicated by the descriptor desc(program) queued first among the descriptors queued in the descriptor queue DQ3 being the target descriptor queue, that is, the program operation, is executable based on information on an available power budget and information on a power consumption amount estimated for the descriptor desc(program).

When the descriptor desc(program) is executable, the program operation indicated by the descriptor desc(program) is executed, and the descriptor desc(program) is dequeued from the descriptor queue DQ3.

On the other hand, when the descriptor desc(program) is not executable, a separate descriptor queue different from a descriptor queue currently selected as a target descriptor queue may be reselected as a target descriptor queue. At this time, the descriptor desc(program) is not dequeued from the target descriptor queue.

Figure 8:
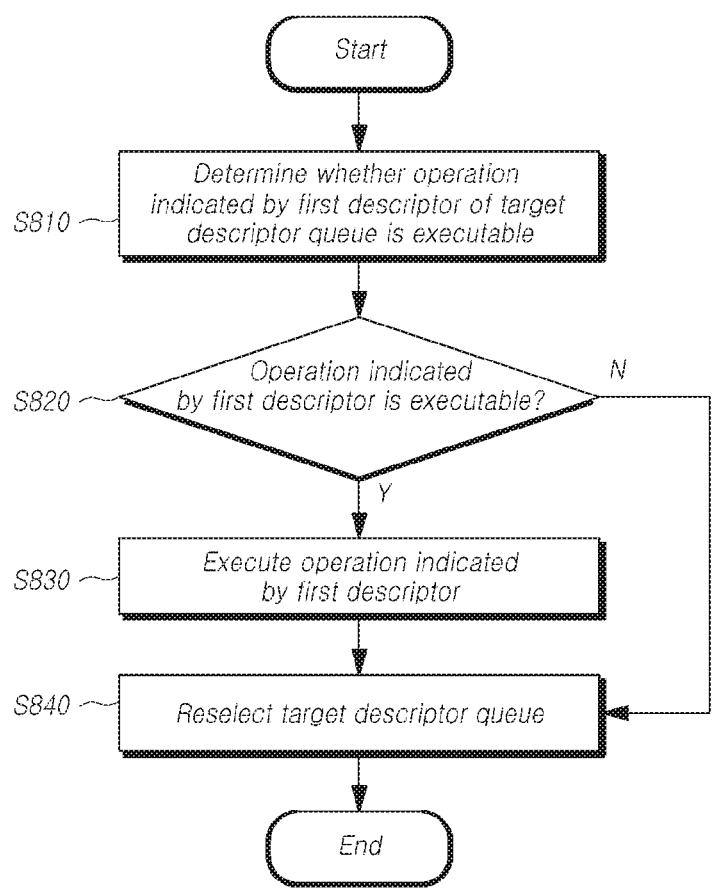
FIG. 8 is a flow chart of a process of executing an operation indicated by a descriptor queued in a target descriptor queue in accordance with embodiments of the disclosure.

FIG. 8 is a flow chart of a process of executing an operation indicated by a descriptor queued in a target descriptor queue in the embodiments of the disclosure.

FIG. 8 shows an example of a case when only one descriptor corresponds to one command or the case when, even though a plurality of descriptors may correspond to one command, only an operation indicated by one descriptor is executable each time a target descriptor queue is selected.

Hereinafter, an example will be described in which the present process is performed by the controller 120 described above with reference to FIG. 1.

First, the descriptor execution control circuit 127 may determine whether an operation indicated by a first descriptor queued in a currently selected target descriptor queue is executable. For example, the descriptor execution control circuit 127 may determine whether the operation indicated by the first descriptor is executable based on information on an available power budget of the semiconductor memory device 110 and information on a power consumption amount estimated for the first descriptor (S810).

When it is determined that the operation indicated by the first descriptor is executable (S820—Y), the descriptor execution control circuit 127 performs control so that the operation indicated by the first descriptor is executed (S830).

Thereafter, the descriptor queue selection circuit 126 performs an operation of reselecting one target descriptor queue among N number of descriptor queues (S840).

On the other hand, when it is determined that the operation indicated by the first descriptor is not executable (S820—N), the operation indicated by the first descriptor is not executed, and the step S840 is immediately performed.

Figure 9:
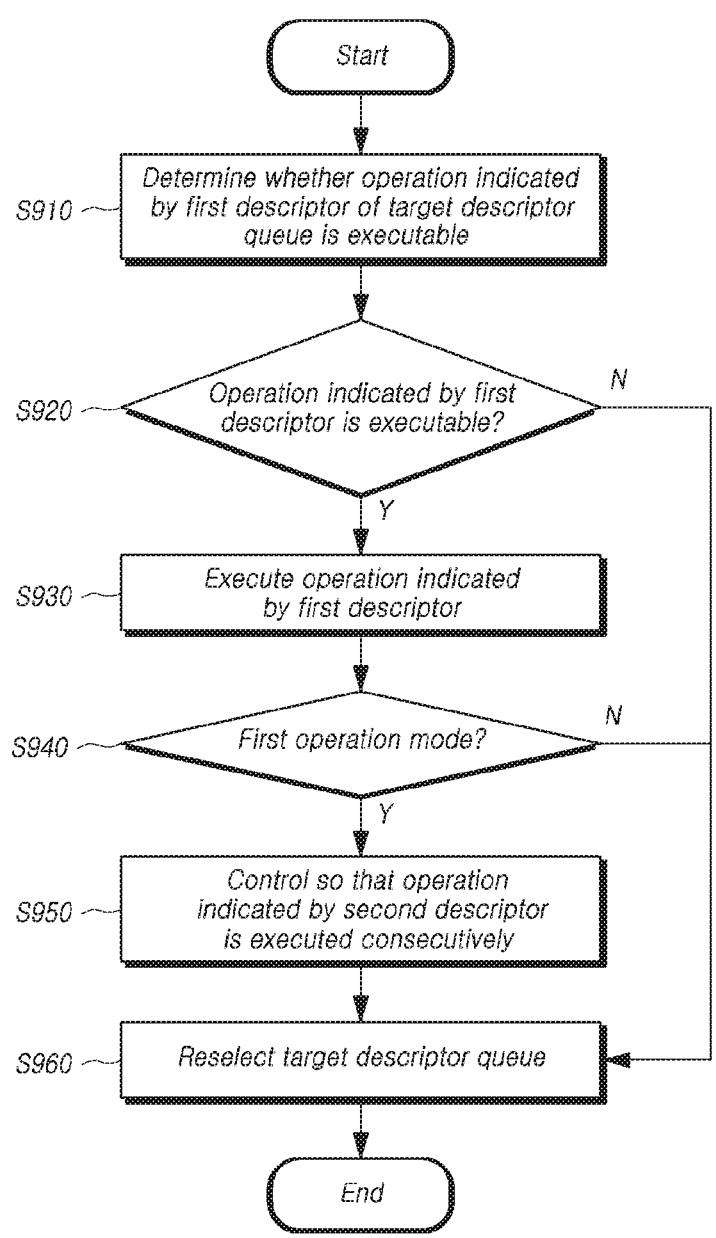
FIG. 9 is a flow chart of a process of executing an operation indicated by a descriptor queued in a target descriptor queue in accordance with embodiments of the disclosure.

FIG. 9 is a flow chart of a process of executing an operation indicated by a descriptor queued in a target descriptor queue in accordance with embodiments of the disclosure.

FIG. 9 shows an example of a case in which a plurality of descriptors correspond to one command and operations indicated by the plurality of descriptors queued in a single target descriptor queue are consecutively executable depending on an operation mode.

Hereinafter, an example will be described in which the present process is performed by the controller 120 described above with reference to FIG. 1.

First, in the same manner as in FIG. 8, the descriptor execution control circuit 127 may determine whether an operation indicated by a first descriptor queued in a currently selected target descriptor queue is executable. For example, the descriptor execution control circuit 127 may determine whether the operation indicated by the first descriptor is executable based on information on an available power budget of the semiconductor memory device 110 and information on a power consumption amount estimated for the first descriptor (S910).

When it is determined that the operation indicated by the first descriptor is executable (S920—Y), the descriptor execution control circuit 127 performs control so that the operation indicated by the first descriptor is executed (S930).

On the other hand, when it is determined that the operation indicated by the first descriptor is not executable (S920—N), the operation indicated by the first descriptor is not executed, and, then, the descriptor queue selection circuit 126 performs an operation of reselecting one target descriptor queue among N number of descriptor queues (S960).

After the step S930 is performed, the descriptor execution control circuit 127 determines whether an operation mode of the controller 120 is a first operation mode (S940).

If an operation mode of the controller 120 is the first operation mode (S940—Y), the descriptor execution control circuit 127 may perform control so that, after the operation indicated by the first descriptor queued in the target descriptor queue is executed, an operation indicated by a second descriptor queued in the target descriptor queue is consecutively executed (S950). The second descriptor may be a descriptor which is queued subsequently to the first descriptor in the target descriptor queue. The second descriptor may correspond to the same command as the first descriptor. The descriptor execution control circuit 127 may perform control so that, in the first operation mode, the first descriptor and the second descriptor queued in the target descriptor queue and corresponding to a single command are consecutively executed.

After the step S950 is performed, the descriptor queue selection circuit 126 performs an operation of reselecting one target descriptor queue among the N number of descriptor queues (S960).

If an operation mode of the controller 120 is not the first operation mode (S940—N), that is, when an operation mode of the controller 120 is a second operation mode different from the first operation mode, the step S960 is performed. That is, after the operation indicated by the first descriptor queued in a first descriptor queue selected as a target descriptor queue is executed, in order to allow an operation indicated by another descriptor queued in a second descriptor queue selected as a target descriptor queue subsequently to the first descriptor queue to be executed, an operation of reselecting a target descriptor queue from the first descriptor queue to the second descriptor queue is performed by the descriptor queue selection circuit 126.

FIGS. 10 and 11 are diagrams illustrating power tables used to control execution of operations indicated by descriptors.

A power table may include information on power estimated to be consumed when an operation indicated by a predetermined descriptor is executed depending on a time. For instance, the power table may include informations on an index corresponding to a part of an operation indicated by a descriptor, a mode for an operation corresponding to each index, a time estimated as required to perform the operation corresponding to each index and a value (i.e., an amount) of power estimated as consumed to perform the operation corresponding to each index.

One or more indexes may correspond to one descriptor. This is because power estimated as consumed by an operation indicated by each descriptor may be time-varying.

In the embodiments of the disclosure, a case where the information on the mode is configured by five bits in the power table will be described, but it is to be noted that the number of bits configuring information on a mode may not be fixed and may be changed.

Hereunder, respective bits configuring the information on the mode in the power table will be described. However, positions of the respective bits and information indicated by the respective bits may be changed depending on a realization example, and are not limited to an example to be described below.

First, a bit mode4 as a most significant bit is a bit which indicates whether an operation corresponding to each index is a last operation of a descriptor corresponding to each index. If the value of the bit mode4 is 1, it means that an operation corresponding to a current index is a last operation of a descriptor, and if the value of the bit mode4 is 0, it means that an operation corresponding to a current index is not a last operation of a descriptor.

A bit mode3 is a bit which indicates a reference on which an operation corresponding to a current index is ended. If the value of the bit mode3 is 1, it means that an operation corresponding to a current index is ended at a specific time, and if the value of the bit mode3 is 0, it means that an operation corresponding to a current index is ended when a specific signal is generated.

A bit mode2 is a bit which indicates whether to allocate a power value after an operation corresponding to each index is ended. If the value of the bit mode2 is 1, it means that a power value is allocated for a subsequent descriptor, and if the value of the bit mode2 is 0, it means that a power value is not allocated for a subsequent descriptor.

A bit mode1 is a bit which indicates whether, when an execution request for a new command is inputted, a currently performed operation is to be immediately ended and the execution request for the new command is processed or the currently performed operation is to be continuously performed. If the value of the bit mode1 is 1, the currently performed operation is continuously performed (however, a grant is afforded for the new command), and if the value of the bit mode1 is 0, the currently performed operation is immediately ended and the execution request for the new command is processed.

Finally, a bit mode0 is a bit which indicates whether a power value is to be constantly applied or is to be applied in a linearly decreasing pattern as a differential value, for a corresponding time period. If the value of the bit mode0 is 1, it means that a power value is applied in a linearly decreasing pattern, and if the value of the bit mode0 is 0, it means that a power value is constantly applied.

A unit of time for which an operation corresponding to each index is performed may be variously set. In FIGS. 10 and 11, a case when a unit of time is μs will be described as an example.

The power tables to be described below with reference to FIGS. 10 and 11 may be applied to the descriptor desc(read sensing) indicating a read sensing operation and the descriptor desc(dout) indicating a data output operation, corresponding to the read command cmd(read), among the descriptors described above with reference to FIG. 4. In FIGS. 10 and 11, indexes 0 and 1 correspond to the descriptor desc(read sensing) indicating a read sensing operation, and an index 2 corresponds to the descriptor desc(dout) indicating a data output operation.

FIG. 10 is a power table used to control the execution of an operation indicated by a descriptor in the embodiments of the disclosure.

Referring to FIG. 10, first, for the read sensing operation, a power value of 80 is estimated for 24 µs, depending on information of the index 0 of the power table. Thereafter, since the value of the bit mode4 of the index 1 of the power table is 1, ending the read sensing operation is indicated, and, at this time, a power value is not allocated for a descriptor of the index 2 since the value of the bit mode2 is 0.

Therefore, when an operation indicated by a descriptor is executed according to the power table of FIG. 10, since a power value for the data output operation corresponding to the index 2 is not allocated for a descriptor of the index 2 after the read sensing operation corresponding to the indexes 0 and 1 is executed, the data output operation is not performed subsequently to the read sensing operation.

FIG. 11 is a power table for controlling the execution of an operation indicated by a descriptor in the embodiments of the disclosure.

When compared to FIG. 10, FIG. 11 has a difference in that, in the entry of the index 1 of the power table, the bit mode1 is set to 1 and a power value is estimated as 80. Therefore, when an operation indicated by a descriptor is executed according to the power table of FIG. 11, after the read sensing operation corresponding to the indexes 0 and 1 is executed, the data output operation may be consecutively executed.

At this time, a power value allocated for the data output operation may be set to the power value (i.e., 80) which is estimated for the descriptor corresponding to the index 0 or less. That is, a power value may be estimated in a power table such that a power consumption amount estimated for a subsequent descriptor (for example, indicating the data output operation) is equal to or less than a power consumption amount estimated for a previous descriptor (for example, indicating the read sensing operation).

Meanwhile, a power value may be estimated in the power table such that both a power consumption amount estimated for a previous descriptor (e.g., indicating the read sensing operation) and a power consumption amount estimated for a subsequent descriptor (e.g., indicating the data output operation) are determined to be equal to or less than a maximum power consumption amount estimated based on information on an available power budget.

For example, when a current maximum power consumption amount is 80, power values estimated for the descriptors corresponding to the index 0 to the index 2 in the power table may be set not to exceed 80.

Figure 12:
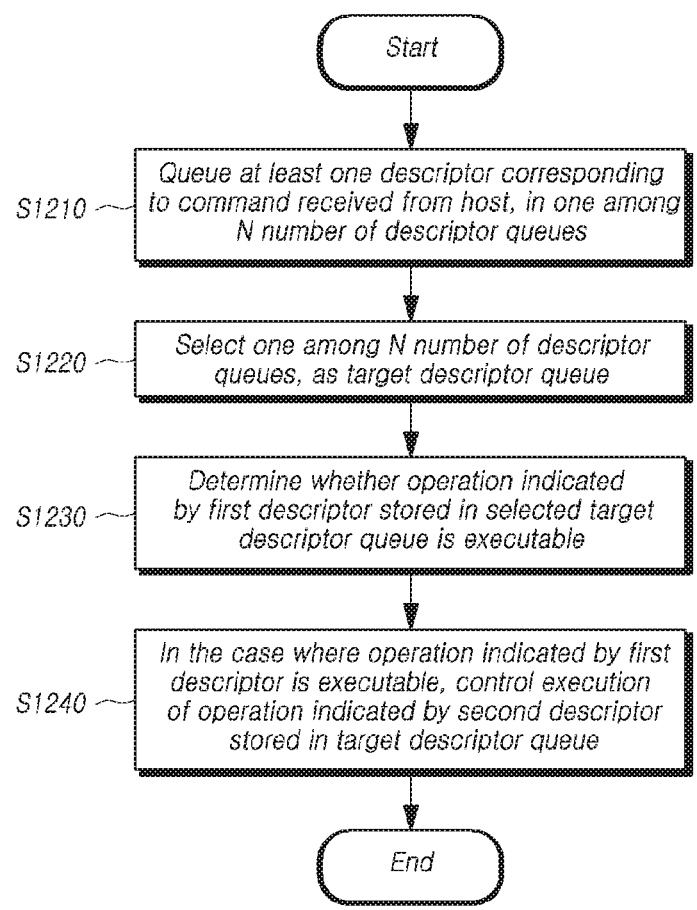
FIG. 12 is a flow chart of a method for operating a controller in accordance with embodiments of the disclosure.

FIG. 12 is a flow chart of a method for operating the controller 120 in accordance with embodiments of the disclosure.

Hereinafter, an example will be described in which the present method is executed by the controller 120 in the storage device 100 described above with reference to FIG. 1.

Referring to FIG. 12, first, the descriptor storage circuit 125 of the controller 120 may queue at least one descriptor corresponding to a command received from the host 50, in one descriptor queue among N (N is a natural number) number of descriptor queues (S1210).

The descriptor queue selection circuit 126 of the controller 120 may select one descriptor queue among the N number of descriptor queues, as a target descriptor queue (S1220).

The descriptor execution control circuit 127 of the controller 120 may determine whether an operation indicated by a first descriptor queued in the target descriptor queue is executable (S1230). The descriptor execution control circuit 127 may determine whether the operation indicated by the first descriptor is executable based on information on an available power budget and information on a power consumption amount estimated for the first descriptor.

When it is determined at the step S1230 that the operation indicated by the first descriptor is executable, the descriptor execution control circuit 127 of the controller 120 may control whether to execute an operation indicated by a second descriptor queued together with the first descriptor in the target descriptor queue (S1240).

At the step S1240, the first descriptor and the second descriptor may correspond to the same command. For example, for one read command, the first descriptor may indicate a read sensing operation, and the second descriptor may indicate a data output operation.

At the step S1240, a pattern in which the operation indicated by the second descriptor is executed after the operation indicated by the first descriptor is executed may be changed depending on an operation mode of the controller 120.

For instance, when an operation mode of the controller 120 is the first operation mode, the descriptor execution control circuit 127 may perform control so that, after an operation indicated by a first descriptor queued in a first descriptor queue selected as a target descriptor queue is executed, an operation indicated by a second descriptor queued in the first descriptor queue is consecutively executed. To this end, the descriptor execution control circuit 127 may set a power table as in the example of FIG. 11. At this time, a power consumption amount estimated for the second descriptor may be determined to be equal to or less than a power consumption amount estimated for the first descriptor, and a power consumption amount estimated for each of the first descriptor and the second descriptor may be determined to be equal to or less than a maximum power consumption amount determined based on information on an available power budget.

On the other hand, when an operation mode of the controller 120 is a second operation mode different from the first operation mode, the descriptor execution control circuit 127 may perform control so that, after an operation indicated by a first descriptor queued in a first descriptor queue selected as a target descriptor queue is executed, an operation indicated by another descriptor queued in a second descriptor queue which is selected as a target descriptor queue subsequently to the first descriptor queue is executed. To this end, the descriptor execution control circuit 127 may set a power table as in the example of FIG. 10.

Through the embodiments of the disclosure described above, even though a plurality of descriptors corresponding to one command are inputted to a descriptor queue, the plurality of descriptors may be consecutively processed, which makes it possible to provide a storage device and a controller capable of operating similar to when one descriptor is processed.

Moreover, the embodiments of the disclosure may provide a storage device, a controller and a method for operating a controller, capable of effectively executing operations indicated by the plurality of descriptors.

Also, the embodiments of the disclosure may provide a storage device, a controller and a method for operating a controller, capable of consecutively executing operations indicated by the plurality of descriptors thereby improving the performance.

Further, the embodiments of the disclosure may provide a storage device, a controller and a method for operating a controller, capable of effectively processing one command corresponding to one or more descriptors.

It will be understood by those skilled in the art that the technical configurations of the embodiments of the disclosure described above can be embodied in other specific forms without departing from the spirit and essential characteristics of the embodiments of the disclosure. Therefore, it should be understood that the embodiments of the disclosure described above are to be considered in all respects as illustrative and not restrictive, the scope of the embodiments of the disclosure is indicated by the appended claims rather than the foregoing description, and all changes or modifications that come within the scope of the equivalent concept are to be construed as being included within the scope of the disclosure.

In the above described embodiments of the disclosure, the steps may be selectively performed or omitted. In each embodiment of the disclosure, the steps do not need to occur in a sequential order, and the steps may be changed in order.

The embodiments of the disclosure, which are described in the specification with reference to the accompanying drawings, are to be regarded in an illustrative rather than a restrictive sense in order to help understand the disclosure. It is obvious to those skilled in the art that various modifications and changes can be made thereto without departing from the broader spirit and scope of the disclosure.

Although various embodiments of the disclosure have been described using specific terms, the specification and drawings are to be regarded in an illustrative rather than a restrictive sense in order to help understand the embodiments of the disclosure. Thus, the scope of the disclosure should not be construed as being limited to the embodiments, and rather, it should be recognized as contemplating various changes and modifications within the spirit and scope of the disclosure.

While the present invention has been described with respect to the specific embodiments, it will be apparent to those skilled in the art that various changes and modifications may be made without departing from the spirit and scope of the invention as defined in the following claims.

What is claimed is:

1. A controller suitable for controlling a semiconductor memory device, the controller comprising:
   a descriptor storage circuit configured to queue at least one descriptor corresponding to a command received from a host in one descriptor queue among N number of descriptor queues, where N is a natural number;
   a descriptor queue selection circuit configured to select one descriptor queue among the N number of descriptor queues, as a target descriptor queue; and
   a descriptor execution control circuit configured to:
      determine whether an operation indicated by a first descriptor queued in the target descriptor queue is executable based on information on an available power budget and information on a power consumption amount estimated for the first descriptor; and
      control, when it is determined that the operation indicated by the first descriptor is executable, whether to execute an operation indicated by a second descriptor queued together with the first descriptor in the target descriptor queue.

2. The controller according to claim 1, wherein the descriptor execution control circuit performs, when an operation mode of the controller is a first operation mode, control so that the operation indicated by the second descriptor queued in a first descriptor queue selected as the target descriptor queue is consecutively executed after the operation indicated by the first descriptor queued in the first descriptor queue is executed.

3. The controller according to claim 2, wherein the descriptor execution control circuit performs, when an operation mode of the controller is a second operation mode different from the first operation mode, control so that an operation indicated by another descriptor queued in a second descriptor queue selected as the target descriptor queue is executed, after the operation indicated by the first descriptor queued in a first descriptor queue selected as the target descriptor queue is executed.

4. The controller according to claim 1, wherein the descriptor queue selection circuit selects one descriptor queue among the N number of descriptor queues as the target descriptor queue according to a round-robin manner.

5. The controller according to claim 1, wherein the first descriptor and the second descriptor correspond to a single command.

6. The controller according to claim 5, wherein a power consumption amount estimated for the second descriptor is determined to be equal to or less than the power consumption amount estimated for the first descriptor.

7. The controller according to claim 5, wherein each of the power consumption amounts for the first descriptor and the second descriptor is determined to be equal to or less than a maximum power consumption amount that is determined based on the information on an available power budget.

8. The controller according to claim 5, wherein one of the first descriptor and the second descriptor is a descriptor which indicates a read sensing operation, and the other is a descriptor which indicates a data output operation.

9. The controller according to claim 5, wherein one of the first descriptor and the second descriptor is a descriptor which indicates a cache read sensing operation, and the other is a descriptor which indicates a data output operation.

10. A storage device comprising:
    a semiconductor memory device; and
    a controller configured to control the semiconductor memory device, and execute an operation indicated by at least one descriptor,
    the controller comprising:
       a descriptor storage circuit configured to queue at least one descriptor corresponding to a command received from a host in one descriptor queue among N number of descriptor queues, where N is a natural number;
       a descriptor queue selection circuit configured to select one descriptor queue among the N number of descriptor queues, as a target descriptor queue; and
       a descriptor execution control circuit configured to:
          determine whether an operation indicated by a first descriptor queued in the target descriptor queue is executable based on information on an available power budget and information on a power consumption amount estimated for the first descriptor; and control, when it is determined that the operation indicated by the first descriptor is executable, whether to execute an operation indicated by a second descriptor queued together with the first descriptor in the target descriptor queue.

11. The storage device according to claim 10, wherein the descriptor execution control circuit performs, when an operation mode of the controller is a first operation mode, control so that the operation indicated by the second descriptor queued in a first descriptor queue selected as the target descriptor queue is consecutively executed after the operation indicated by the first descriptor queued in the first descriptor queue is executed.

12. The storage device according to claim 11, wherein the descriptor execution control circuit performs, when an operation mode of the controller is a second operation mode different from the first operation mode, control so that an operation indicated by another descriptor queued in a second descriptor queue selected as the target descriptor queue is executed after the operation indicated by the first descriptor queued in a first descriptor queue selected as the target descriptor queue is executed.

13. The storage device according to claim 10, wherein the first descriptor and the second descriptor correspond to a single command.

14. A method for operating a controller suitable for controlling a semiconductor memory device, the method comprising:
queueing at least one descriptor corresponding to a command received from a host in one descriptor queue among N number of descriptor queues, where N is a natural number;
selecting one descriptor queue among the N number of descriptor queues, as a target descriptor queue;
determining whether an operation indicated by a first descriptor queued in the target descriptor queue is executable based on information on an available power budget and information on a power consumption amount estimated for the first descriptor; and
controlling, when it is determined that the operation indicated by the first descriptor is executable, whether to execute an operation indicated by a second descriptor queued together with the first descriptor in the target descriptor queue.

15. The method according to claim 14, wherein the controlling includes, when an operation mode of the controller is a first operation mode, performing control so that the operation indicated by the second descriptor queued in a first descriptor queue selected as the target descriptor queue is consecutively executed after the operation indicated by the first descriptor queued in the first descriptor queue is executed.

16. The method according to claim 14, wherein the controlling includes, when an operation mode of the controller is a second operation mode different from the first operation mode, performing control so that an operation indicated by another descriptor queued in a second descriptor queue selected as the target descriptor queue is executed after the operation indicated by the first descriptor queued in a first descriptor queue selected as the target descriptor queue is executed.

17. The method according to claim 14, wherein the first descriptor and the second descriptor correspond to a single command.

* * * * *